United States Patent [19]
Nakayama

[11] Patent Number: 5,243,166
[45] Date of Patent: Sep. 7, 1993

[54] WIRECUT ELECTRICAL DISCHARGE MACHINE AND METHOD OF USE THEREOF

[75] Inventor: Yoshiro Nakayama, Aichi, Japan
[73] Assignee: Mitsubishi Denki K.K., Tokyo, Japan
[21] Appl. No.: 895,804
[22] Filed: Jun. 9, 1992

[30] Foreign Application Priority Data
Dec. 2, 1991 [JP] Japan .................. 3-317824

[51] Int. Cl.⁵ .................. B23H 7/02; B23H 7/20; B23H 7/36
[52] U.S. Cl. .................. 219/69.12; 219/69.14
[58] Field of Search ............ 219/69.12, 69.13, 69.14, 219/69.17

[56] References Cited

U.S. PATENT DOCUMENTS

| | | | |
|---|---|---|---|
| 4,052,583 | 10/1977 | Inoue | 219/69.12 |
| 4,392,041 | 7/1983 | Yatomi et al. | 219/69.12 |
| 4,510,367 | 4/1985 | Obara | 219/69.12 |
| 4,559,434 | 12/1985 | Kinoshita | 219/69.17 |
| 4,833,290 | 5/1989 | Obara | 219/69.12 |
| 5,045,663 | 9/1991 | Neal et al. | 219/69.12 |

FOREIGN PATENT DOCUMENTS

| | | |
|---|---|---|
| 0165438 | 12/1985 | European Pat. Off. . |
| 0280735 | 9/1988 | European Pat. Off. . |
| 60-52890 | 11/1985 | Japan . |
| 63-57123 | 3/1988 | Japan . |
| 2-53526 | 2/1990 | Japan . |

OTHER PUBLICATIONS

Published English-Language Abstract of Japanese Patent Application Laid-Open No. 61-146420 "Electric Discharge Machine", Haruki Obara, Jul. 4, 1986.
Published English-Language Abstract of Japanese Patent Application Laid-Open No. 61-164721 "Wire Electric Discharge Machine", Masatoshi Yamaya, Jul. 25, 1986.

Primary Examiner—Geoffrey S. Evans
Attorney, Agent, or Firm—Sughrue, Mion, Zinn, Macpeak & Seas

[57] ABSTRACT

A method and apparatus of operating a wirecut electrical discharge machine for cutting a workpiece using a generated electrical discharge in a machining gap wherein the workpiece is opposing a wire electrode. The method comprises the steps of presetting a plurality of machining conditions in accordance with dielectric pressure and machined plate thickness combinations, storing the preset machining conditions in a memory, and automatically setting an optimum machining condition based on detected dielectric pressures and the machined plate thickness calculated in a numerical controller. The machined plate thickness may be calculated by dividing an area machining feedrate corresponding to present electrical condition parameters by the actual machining feedrate.

11 Claims, 6 Drawing Sheets

| EC | ELECTRICAL CONDITION PARAMETER | F UPPER LIMIT | F LOWER LIMIT | PLATE THICKNESS |
|---|---|---|---|---|
| $EC_0$ | $I_{p0} - \tau_{p0} - \tau_{v0} - C_0$ | $F_0$ | $F_0'$ | $0 - t_0$ |
| $EC_1$ | $I_{p1} - \tau_{p1} - \tau_{v1} - C_1$ | $F_1$ | $F_1'$ | $t_0 - t_1$ |
| $EC_2$ | $I_{p2} - \tau_{p2} - \tau_{v2} - C_2$ | $F_2$ | $F_2'$ | $t_1 - t_2$ |
| $EC_3$ | $I_{p3} - \tau_{p3} - \tau_{v3} - C_3$ | $F_3$ | $F_3'$ | $t_2 - t_3$ |
| $EC_4$ | $I_{p4} - \tau_{p4} - \tau_{v4} - C_4$ | $F_4$ | $F_4'$ | $t_3 - t_4$ |
| ⋮ | ⋮ | ⋮ | ⋮ |  |
| $EC_n$ | $I_{pn} - \tau_{pn} - \tau_{vn} - C_n$ | $F_n$ | $F_n'$ | $t_{0n} - t_n$ |

FIG. 7

| ELECTRICAL CONDITION PARAMETER SET | ELECTRICAL CONDITION PARAMETERS | AREA MACHINING FEEDRATE |
|---|---|---|
| $E_{100}$ | $IP_{100} - \tau_{p100} - \tau_{r100} - C_{100}$ | $S_{100}$ |
| $E_{101}$ | $IP_{101} - \tau_{p101} - \tau_{r101} - C_{101}$ | $S_{101}$ |
| $E_{102}$ | $IP_{102} - \tau_{p102} - \tau_{r102} - C_{102}$ | $S_{102}$ |
| ⋮ | ..... | ⋮ |
| $E_{na}$ | $IP_{na} - \tau_{pna} - \tau_{rna} - C_{na}$ | $S_{na}$ |

FIG. 8

| MACHINING CONDITION | ELECTRICAL CONDITION PARAMETER SET | MACHINING FEEDRATE UPPER LIMIT | MACHINING FEEDRATE LOWER LIMIT |
|---|---|---|---|
| $K_{100}$ | $E_{100}$ | $F_{100}$ | $F'_{100}$ |
| $K_{101}$ | $E_{101}$ | $F_{101}$ | $F'_{101}$ |
| $K_{102}$ | $E_{102}$ | $F_{102}$ | $F'_{102}$ |
| ⋮ | ⋮ | ⋮ | ⋮ |
| $K_{na}$ | $E_{na}$ | $F_{na}$ | $F'_{na}$ |

FIG. 9

| DIELECTRIC PLATE THICKNESS \ PRESS. | $P_{u1} \sim P_{u2}$<br>$P_{d1} \sim P_{d2}$ | $P_{u2} \sim P_{u3}$<br>$P_{d2} \sim P_{d3}$ | $P_{u3} \sim P_{u4}$<br>$P_{d3} \sim P_{d4}$ | ..... | $P_{un} \sim P_{un+1}$<br>$P_{dn} \sim P_{dn}$ |
|---|---|---|---|---|---|
| $0 \sim t_1$ | $K_{100}$ | $K_{200}$ | $K_{300}$ | ..... | $K_{n00}$ |
| $t_1 \sim t_2$ | $K_{101}$ | $K_{201}$ | $K_{301}$ | ..... | $K_{n01}$ |
| $t_2 \sim t_3$ | $K_{102}$ | $K_{202}$ | $K_{302}$ | ..... | $K_{n02}$ |
| ⋮ | ⋮ | ⋮ | ⋮ | ..... | ⋮ |
| $t_n \sim t_{n+1}$ | $K_{10n}$ | $K_{20n}$ | $K_{30n}$ | ..... | $K_{nn}$ |

WIRECUT ELECTRICAL DISCHARGE MACHINE AND METHOD OF USE THEREOF

FIELD OF THE INVENTION

The present invention relates to a wirecut electrical discharge machine (EDM) for the electrical discharge machining of a workpiece employing a wire electrode and, more particularly, to a wirecut electrical discharge machine for controlling electrical machining conditions in accordance with plate thickness changes in the workpiece and dielectric pressure changes in the wirecut electrical discharge machine.

BACKGROUND OF THE INVENTION

Wirecut electrical discharge machines are known which employ a metal wire of approximately 0.05 to 0.3 mm in diameter as an electrode. The metal wire is fed in X and Y directions relative to a workpiece to perform machining operations, e.g., cutting and contour shape forming. The wire electrode is usually controlled to be relatively fed at a stepped, constant speed in units of 1 $\mu$m per pulse, with the feedrate controlled so as to maintain a discharge of constant voltage in the machining gap without the need of controlling discharge energy, etc. However, when the thickness of the workpiece is not uniform, the workpiece is machined with the initial speed set at the speed corresponding to the maximum plate thickness (maximum area to be machined) in order to prevent short circuits between the wire and the workpiece or wire electrode breakage. In other words, the wire electrode is fed at the initially set low speed even though the plate thickness may have decreased during machining. Therefore, the overall machining efficiency is reduced.

A process for improving the above inefficiency was presented in Japanese Patent Publication No. 52890 of 1985. In this process, data combining the electrical conditions of a machining power supply suitable for various plate thicknesses of the workpiece and corresponding machining feedrates are stored in a memory. During operation, the data stored in memory is shifted to change the electrical conditions in correspondence with the machining feedrate so as to match the machining feedrate stored in memory with the machining feedrate during machining.

An example of this process will be explained in reference to FIG. 1, which illustrates a wirecut electrical discharge machine, wherein the numeral 1 indicates a wire electrode, 2 indicates a workpiece, 3 and 4 indicate upper and lower dielectric nozzles for injecting dielectric, respectively, 5 and 6 denote upper and lower wire guides for guiding the wire electrode 1, respectively, 7 indicates a feeder for feeding electrical power to the wire electrode 1, 8 designates a machining power supply, 9 denotes a table feed controller for controlling the movement of a table supporting the workpiece 2, 10 and 11 designate X-axis and Y-axis motors for driving the table in X and Y directions, respectively, and 12 indicates a numerical controller (NC) comprising a CPU, memories, a keyboard, a CRT, etc. The NC includes at least one memory which stores preset electrical conditions (ECs), i.e., peak machining currents $I_{Pn}$, pulse widths $\tau_{Pn}$, pulse-off periods $\tau_{rn}$ and capacitor capacities $C_n$, and the upper and lower limits of relevant machining feedrates F which correspond to various plate thicknesses. The memory stores data as generally shown in FIG. 2, where, for example, if the plate thickness is in the range of 0 to $t_0$, for a feedrate between FO and FO', the optimal electrical conditions are given by $EC_0$.

FIG. 3 illustrates the changing of the electrical conditions in response to changes in the plate thickness of the workpiece 2. Assume that the workpiece 2 of plate thickness t satisfying the condition $t_3 < t < t_4$ is to be machined using electrical condition $EC_4$. When machining is to be effected using this electrical condition, i.e., with a peak machining current of $I_{P4}$, pulse width of $\tau_{P4}$, width of $\tau_{r4}$, and capacitor capacity of $C_4$, the machining feedrate F is between $F_4$ and $F'_4$. Now assume that plate thickness t of the workpiece 2 changes to a thickness satisfying the condition $t < t < t_2$, i.e., the plate thickness t decreases. Since the electrical condition was set to $EC_4$, the actual machining feedrate F can be increased to exceed $F_4$, the upper limit of the machining feedrate F of electrical condition $EC_4$. Hence, a command is given to the machining power supply 8 to reduce the electrical conditions by one step, i.e., to $EC_3$.

Since the actual plate thickness is smaller than the plate thickness of electrical condition $EC_3$, the machining feedrate F can exceed $F_3$ and the next electrical condition $EC_2$ is then output. The electrical conditions are thus changed until the actual plate thickness matches the plate thickness of the electrical condition. In this way, this process automatically changes the electrical condition in accordance with the actual plate thickness, allowing more efficient machining of workpiece 2.

Electrical condition switching for the known wirecut electrical discharge machine designed as described above changes the electrical conditions in accordance with a change in plate thickness when the plate thickness varies as shown in FIG. 4. However, referring to FIG. 1, it will be noted that since the positions of the dielectric nozzles remain unchanged, spacings between the workpiece and dielectric nozzles change in accordance with the change in plate thickness. This, in turn, causes the pressures of the dielectric injected into the machining gap to increase when the spacings between the workpiece and dielectric nozzles are small and to decrease when the spacings are large. In addition, when the dielectric pressures are low, sludge and other deleterious materials produced by the electrical discharge occurring in the machining gap cannot be fully removed. It will be apparent that without proper sludge removal, the focused electrical discharge will break the wire electrode unless the electrical condition is changed.

SUMMARY OF THE INVENTION

It is, accordingly, an object of the present invention to overcome the disadvantages in the prior art by providing a process of automatically changing machining conditions in accordance with the machined plate thickness and dielectric pressure.

Another object of the present invention is to provide a method for operating a wirecut electrical discharge machine wherein the optimum machining condition is selected based on estimated machined plate thickness and detected dielectric pressures. In particular, the estimated machined plate thickness advantageously is calculated based on the actual machining feedrate and an area machining feedrate corresponding to a present electrical condition parameter.

The present invention is intended to detect dielectric pressure changes corresponding to changes in spacing between a workpiece and dielectric nozzles by means of a plurality of pressure sensors, to detect a change in machined plate thickness by detecting the machining feedrate for the workpiece and to automatically select an optimum machining condition from a plurality of prestored machining conditions based on the dielectric pressure and the detected machining feedrate.

These and other objects, features and advantages are provided by a method of operating a wirecut electrical discharge machine for cutting a workpiece by means of electrical discharge generated in a machining gap wherein the workpiece is opposed to a wire electrode, the method comprising the steps Of presetting a plurality of machining conditions in accordance with dielectric pressure and machined plate thickness combinations, storing the preset machining conditions in a memory, and automatically setting an optimum machining condition based on detected dielectric pressures and a machined plate thickness calculated in a numerical controller.

According to a preferred embodiment of the present invention, the wirecut electrical discharge machine comprises a wire electrode opposing a workpiece, a plurality of nozzles disposed adjacent to the wire electrode for supplying dielectric to a machining gap formed in the workpiece by operation of the wire electrode according to one of a plurality of machining conditions, wherein each of the nozzles comprises a dielectric pressure detector, a control circuit for controlling a plurality of electrical condition parameters associated with wire electrode machining, and a device for selecting one of the machining conditions based on signals produced by the dielectric pressure detectors and an area machining feedrate corresponding to at least one of the electrical condition parameters. In the present invention, the electrical condition parameters comprise peak current, pulse width, pulse-off period and capacitor capacity.

According to one aspect of the present invention, each of the machining conditions represents a combination of at least one of the electrical condition parameters and upper and lower commanded machining feedrates. The wirecut electrical discharge machine also includes an actual machining feedrate determining device which, in conjunction with the selecting device, allows the machine to estimate plate thickness based on the actual machining feedrate and the area machining feedrate, wherein the selected one of the machining conditions is selected based on the estimated plate thickness and the signals generated by the pressure detectors.

These and other objects, features and advantages of the invention are disclosed in or apparent from the following description of preferred embodiments.

BRIEF DESCRIPTION OF THE DRAWINGS

The preferred embodiments are described with reference to the drawings, in which like elements are denoted throughout by like or similar numbers, and in which:

FIG. 7 is a table illustrating electrical condition parameters comprising combinations of electrical parameters and area machining feedrates;

FIG. 8 is a table illustrating machining conditions comprising combinations of electrical condition parameters and upper and lower limits of machining feedrates; and FIG. 9 is a table illustrating machining condition matrices comprising combinations of machined plate thicknesses and dielectric pressures used in the flowchart of FIG. 6.

DESCRIPTION OF THE PREFERRED EMBODIMENTS

Figure 1:
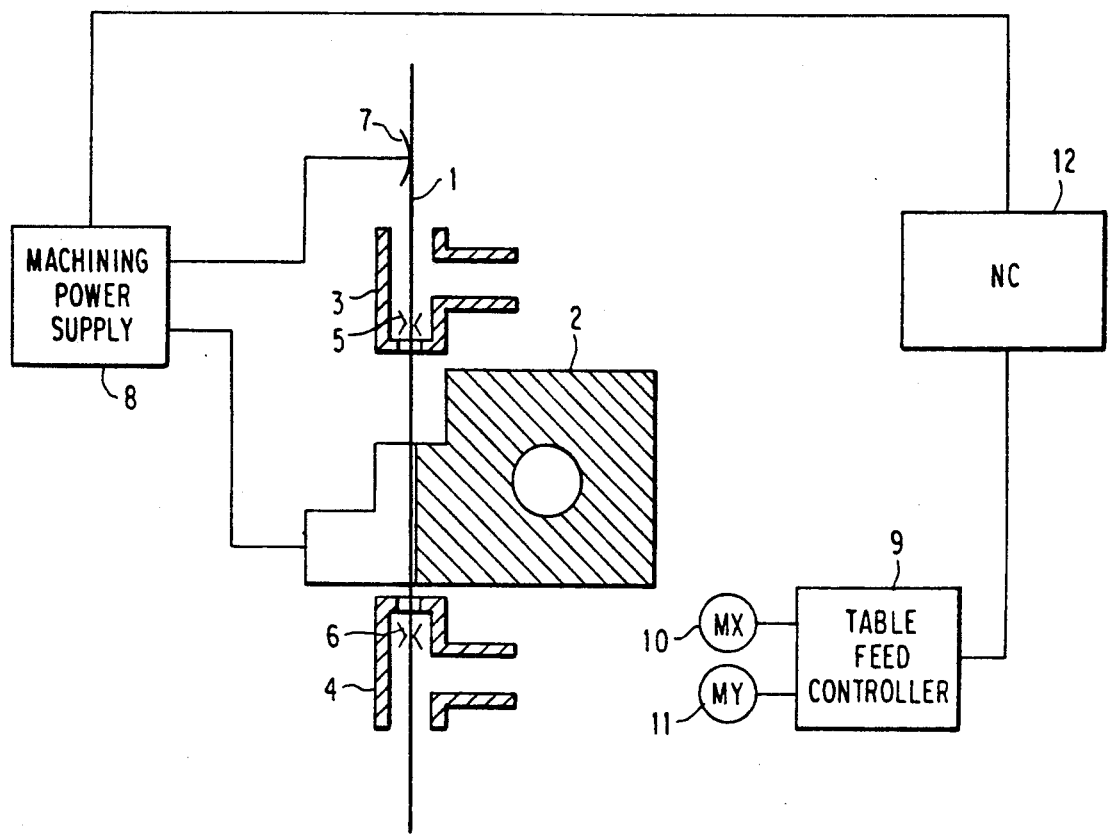
FIG. 1 is a schematic diagram of a wirecut electrical discharge machine known in the art.
Figures 2, 3:
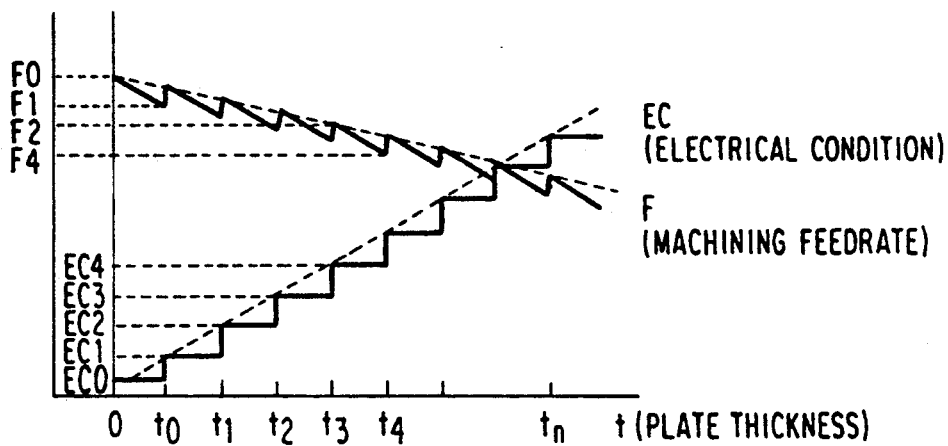
FIG. 2 illustrates the memory contents of the machine of FIG. 1.
FIG. 3 indicates relationships between machined plate thickness and electrical conditions.
Figure 5:
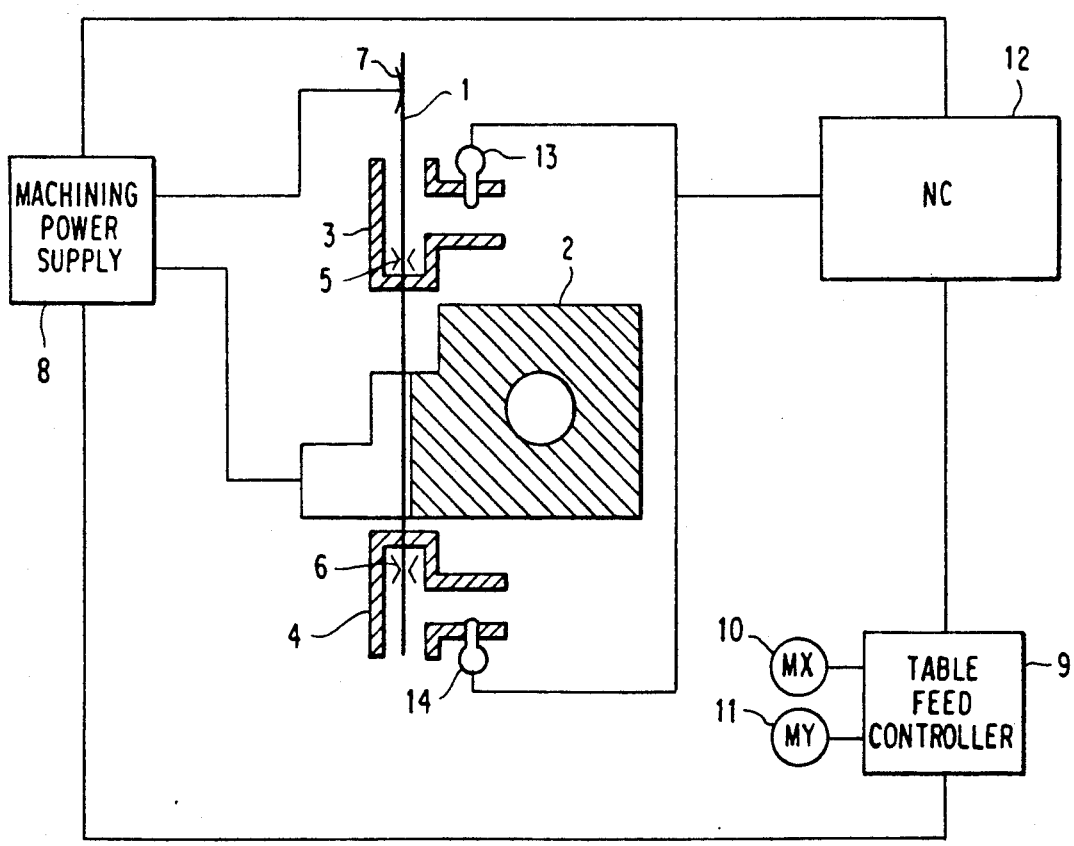
FIG. 5 is a schematic diagram of a wirecut electrical discharge machine according to an embodiment of the present invention.

A preferred embodiment of the present invention will now be described with reference to the drawings. In FIG. 5 the numerals 13 and 14 indicate pressure sensors provided in dielectric nozzles or piping (not shown) for detecting pressures of the dielectric in upper and lower nozzles 3 and 4, respectively. The other parts illustrated in FIG. 5 are identical to those shown in FIG. 1 and described above.

Figure 6:
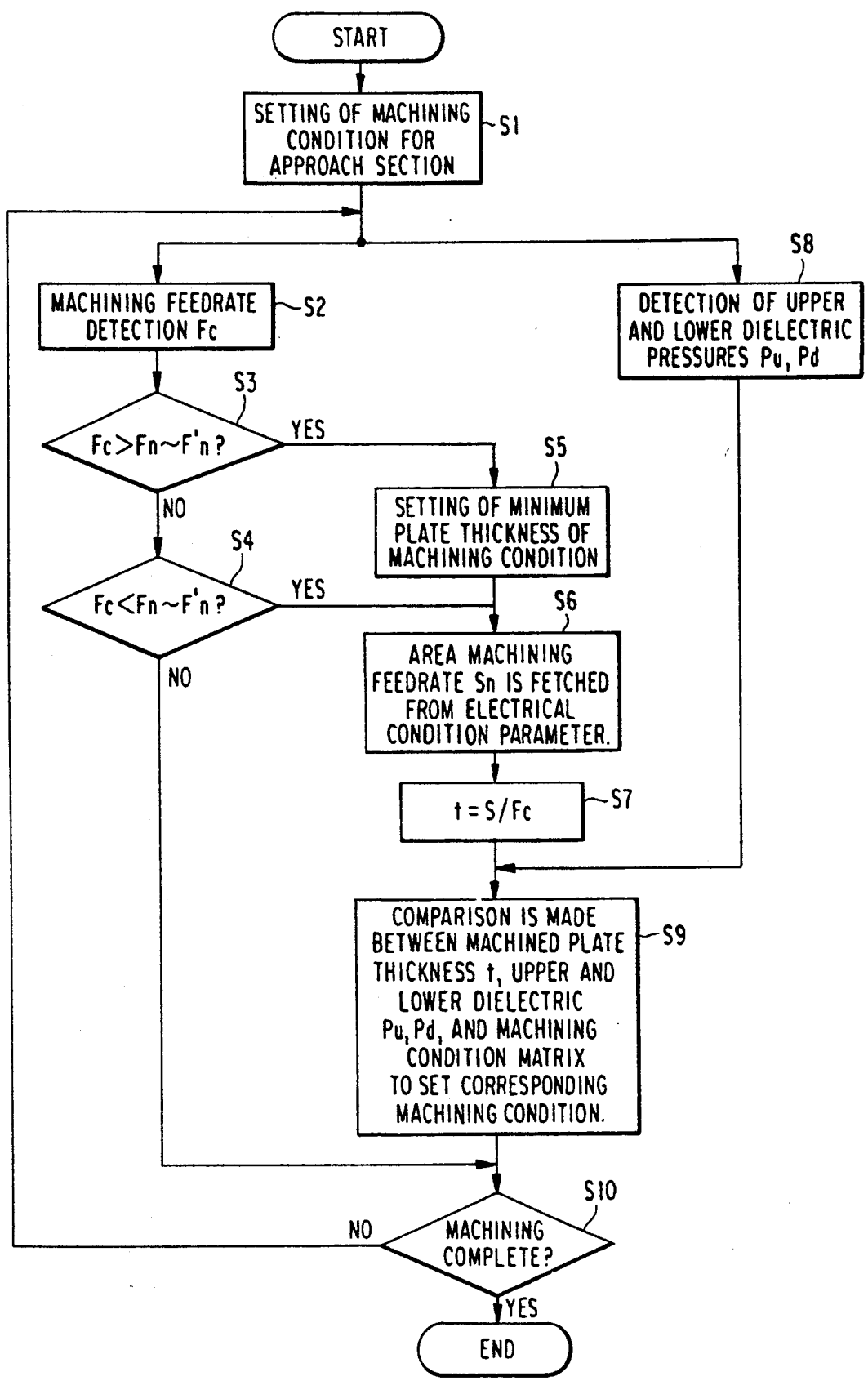
FIG. 6 is a flowchart illustrating a sequence of operation of the wirecut electrical discharge machine of FIG. 5.

FIG. 6 is a flowchart illustrating an operating sequence of one embodiment of the present invention. FIG. 7 illustrates the relationships between electrical parameters, generally denoted E, and defining, for example, peak current $I_P$, pulse width $\tau_P$, pulse-off period $\tau_r$ and capacitor capacity C combinations corresponding to area machining feedrates, generally denoted S. There may be several hundred E combinations. It should be noted that these relationships are already defined and stored in the memory of NC 12. As shown in FIG. 8, the relationships between the electrical parameter sets E and the upper and lower limits of the machining feedrates F are defined as machining conditions, generally denoted K, which are also stored in the memory of NC 12.

It will be apparent that the optimum machining conditions are dependent not only on the thickness of the workpiece 2 but on the pressures of the dielectric ejected from nozzles 3 and 4. For example, given a workpiece 2 of constant thickness t, when the pressure in nozzles 3 and 4 decreases, a condition exists where the sludge produced by the machining may not be properly removed. On the other hand, if the pressures in nozzles 3 and 4 increase, the increase may be indicative of an increase in workpiece 2 plate thickness. As shown in FIG. 9, the optimum machining condition advantageously is set for a particular workpiece thickness t and a predetermined dielectric pressure range P. It will be appreciated that since the thickness t is actually a range of values, corresponding upper and lower pressure ranges, $P_{u1}$ to $P_{u2}$ and $P_{d1}$ to $P_{d2}$, respectively, are advantageously established for each thickness range $t_1$ to $t_2$. As shown in FIG. 9, the machined plate thicknesses and dielectric pressures are listed as matrices together with the corresponding machining conditions, and stored in the memory of NC 12. Actual maximum values of P are in the vicinity of 25 kg/mm$^2$.

Figure 4:
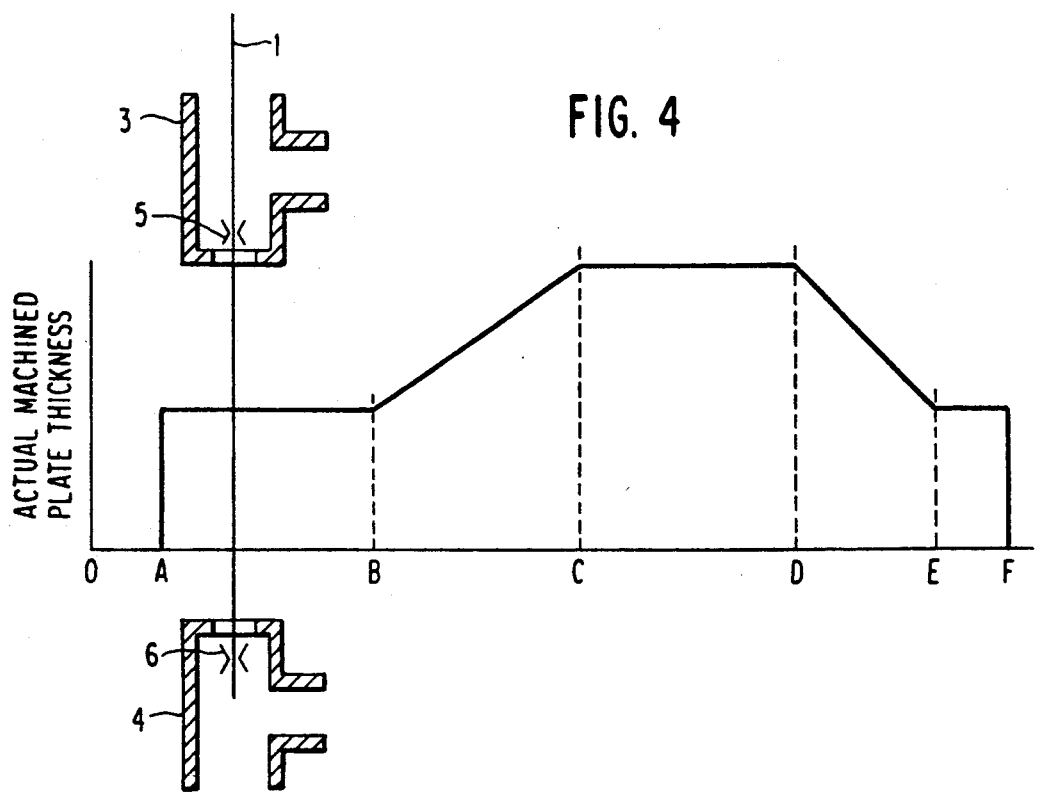
FIG. 4 shows the profile of a workpiece having thickness variations which is used to explain the operation of the wirecut electrical discharge machine according to the present invention.

The machining operation according to the present invention for a workpiece 2 having a thickness t profile as shown in FIG. 4 will now be described while referring to the flowchart of FIG. 6. During step S1, a section 0-A defining an approach zone of workpiece 2 is machined starting with the initial machining conditions consisting of the electrical condition parameter set, machining feedrate F, etc., corresponding to $K_{100}$. In section 0-A the table is fed at the machining feedrate between $F_{100}$ to $F'_{100}$ corresponding to the area machining feedrate $S_{100}$, as shown in FIG. 7. When machining of section 0-A is finished, electrical discharge machining is initiated in section A-B.

Assume that the plate thickness $t_i$ in section A-B is $t_2 < t_i < t_3$. Since the average voltage is controlled to be constant after the start of machining, the machining feedrate Fc decreases. During step S2, the machining feedrate Fc is detected and is compared with the upper limit $F_{100}$ and lower limit $F'_{100}$ of the reference machining feedrate set in section 0-A during steps S3 and S4. During step S7 the machined plate thickness $t_i$ is calculated by dividing the area machining feedrate $S_{100}$ retrieved from memory during step S6, which feedrate was found from the electrical condition parameter $E_{100}$ set while machining section 0-A, by the machining feedrate Fc, which was detected during parallel operating step S2, according to the formula:

$$t_i = S_{100}/Fc \quad (>S_{100}/F_{100})$$

If the result of the calculation of step S7 satisfies the condition $t < t_i < t_2$, the corresponding machining condition $k_{nm}$, for example, machining condition $K_{101}$, is selected from the machining condition matrices shown in FIG. 9 during step S9 based on the combination of the upper dielectric pressure $P_u$ (here, between $P_{u1}$ and $P_{u2}$) and the lower dielectric pressure $P_d$ (here, between $P_{u1}$ and $P_{u2}$) detected separately by the dielectric pressure sensors during step S8. According to the selection of, e.g, $K_{101}$, corresponding parameters $E_{101}$ and $S_{101}$ are set as indicated in FIGS. 7 and 8. However, the machining feedrate corresponding to the machining condition $K_{101}$ is the machining feedrate range of $F_{101}$ to $F'_{101}$ and, thus, if Fc $>(F_{101}$ to $F'_{101})$, the machined plate thickness is calculated again:

$$t_i = S_{101}/Fc \quad (>S_{101}/F_{101})$$

This sequence of operation is repeated until the machined plate thickness $t_i$ satisfies the condition $t_2 < t_i < t_3$. When the actual machined plate thickness approximately matches the calculated machined plate thickness $t_i$, i.e., when the machining feedrate commanded by the machining conditions approximately matches the detected machining feedrate, machining using the corresponding machining condition, e.g., machining condition $K_{102}$ here, is effected in section A-B. In other words, once the actual machining feedrate is approximately equal to the commanded machining feedrate (i.e., is within the predetermined range), the machining is performed according to operational steps S3, S4 and S10, which are performed repeatedly until the actual machining feedrate no longer matches the commanded machining feedrate range.

It will be noted that in section A-B of FIG. 4, the machined plate thickness is constant. It will also be appreciated from examination of FIG. 9 that if the dielectric pressure $P_u$ or $P_d$ changes for some reason, the machining condition $K_{102}$ shifts to another machining condition $K_{n02}$. It will be apparent that for section B-C, where the machined plate thickness increases along with the progress of machining, the machining conditions are continuously changed during machining as described above.

In section D-E, since the machined plate thickness is reduced as machining progresses, the machining feedrate increases and exceeds the upper limit Fnm of the reference machining feedrate set for section C-D in step S3. During Step S5, the machined plate thickness is set to the minimum plate thickness of the machining condition $K_{100}$, the machined plate thickness calculation of step S7 is repeated, and the machining condition is shifted to another machining condition $K_{nm}$ until the calculated machined plate thickness matches the actual machined plate thickness. When the actual machined plate thickness approximately matches the calculated machined plate thickness, the machining condition $K_{nm}$ is selected in accordance with the combination of the machined plate thickness and dielectric pressure separately detected.

It will be apparent that the present invention, as described above, allows changes in dielectric pressures, which occur due to changes in spacings between a workpiece and dielectric nozzles, to be detected by dielectric pressure sensors and the machining condition to be automatically determined in response to both dielectric pressure and machined plate thickness. Therefore, when the dielectric pressures are low, the present invention does not provide high electrical discharge energy, thereby protecting the wire electrode from breakage. The present invention advantageously responds automatically to any unexpected machined plate thickness change.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of operating a wirecut electrical discharge machine for cutting a workpiece by means of electrical discharge generated in a machining gap wherein the workpiece is opposed to a wire electrode, the method comprising the steps of:

presetting a plurality of machining conditions in accordance with dielectric pressure and machined plate thickness combinations;

storing said preset machining conditions in a memory; and automatically setting an optimum machining condition from the detected dielectric pressures and machined plate thickness values as calculated in a numerical controller.

2. A method of operating a wirecut electrical discharge machine for cutting a workpiece by means of electrical discharge generated in a machining gap, the machine having means for detection of a dielectric pressure, the method comprising the steps of:

presetting a plurality of machining conditions in accordance with dielectric pressure and machined plate thickness combinations;

storing said preset machining conditions in a memory;

detecting an actual machining feedrate;

detecting at least one dielectric pressure;

comparing said actual machining feedrate to a selected feedrate range corresponding to a present machining condition;

calculating an estimated thickness of said workpiece based on said actual machining feedrate; and selecting an optimum one of said machining conditions based on said at least one dielectric pressure and said estimated thickness.

3. The method of claims 2, wherein said comparing step further comprises setting a predetermined machining condition corresponding to a minimum thickness of said workpiece when said machining feedrate is greater than a feedrate range corresponding to a present machining condition.

4. The method of claim 2, wherein said calculating step further comprises the steps of:

retrieving an area machining feedrate from said memory, in correspondence to a present machining condition; and calculating said estimated thickness by dividing said area machining feedrate by said actual machining feedrate.

5. A method of operating a wirecut electrical discharge machine for cutting a workpiece by means of electrical discharge generated in a machining gap wherein the workpiece is opposed to a wire electrode, the method comprising the steps of:

storing a plurality of machining conditions based on dielectric pressure and machined plate thickness combinations in memory;

setting one of said machining conditions;

determining a present machining feedrate; and when said present machining feedrate is not substantially equal to a set machining feedrate corresponding to the set one of said machining conditions, automatically settling an optimum machining condition from detected dielectric pressures and a machined plate thickness determined based on said present machining feedrate.

6. The method of claim 5, wherein said automatic setting step comprises the steps of:

calculating an estimated plate thickness by dividing an area machining feedrate corresponding to said present machining condition by a detected machining feedrate; and selecting one of said machining conditions based on said estimated plate thickness and said detected dielectric pressures.

7. A wirecut electrical discharge machine, comprising:

a wire electrode opposing a workpiece;

a plurality of nozzles disposed adjacent to said wire electrode for supplying dielectric to a machining gap formed between said workpiece and said wire electrode;

a plurality of dielectric pressure detectors, each of said pressure detectors being operatively connected to a corresponding one of said nozzles for detecting dielectric pressure;

means for controlling a plurality of electrical condition parameters associated with said wire electrode; and means for selecting one of a plurality of machining conditions based on signals produced by said dielectric pressure detectors and an area machining feedrate corresponding to at least one of said electrical condition parameters.

8. The wirecut electrical discharge machine of claim 7, wherein each of said machining conditions corresponds to one of said electrical condition parameters and upper and lower values of machining feedrates and wherein said wirecut electrical discharge machine further comprises means for storing said machining conditions.

9. The wirecut electrical discharge machine of claim 8, further comprising;

means for determining an actual machining feedrate;

means for estimating a plate thickness based on said actual machining feedrate and said area machining feedrate;

wherein said selected one of said machining conditions is selected based on said estimated plate thickness and said signals.

10. The wirecut electrical discharge machine of claim 7, wherein said electrical condition parameters comprise peak current, pulse width, pulse-off switch and capacitor capacity and wherein said wirecut electrical discharge machine further comprises means for storing said electrical condition parameters and said machining conditions.

11. A method of operating a wirecut electrical discharge machine for cutting a workpiece, where the workpiece is opposed to a wire electrode and placed between a pair of dielectric nozzles, the method comprising the steps of:

(a) storing a plurality of machining conditions based on dielectric pressures of said dielectric nozzles and workpiece thickness in a memory, said plurality of machining conditions including a machining feedrate, a machining feedrate upper limit, and a machining feedrate lower limit;

(b) setting a reference machining condition for an initial thickness of a workpiece being cut, said reference machining condition including a reference workpiece thickness, a reference machining feed rate, a reference machining feedrate upper limit, and a reference machining feedrate lower limit;

(c) detecting an actual feed rate of the workpiece being cut;

(d) detecting actual dielectric pressures of said dielectric nozzles surrounding the workpiece being cut;

(e) comparing said detected actual feedrate with said reference machining feedrate upper limit and said reference machining feedrate lower limit;

(f) calculating an estimated plate thickness of the workpiece being cut by comparing said reference machining feedrate with said detected actual feedrate; and (g) comparing said estimated plate thickness and said detected dielectric pressures with said plurality of machining conditions and determining an optimal machining condition, said optimal machining condition including an optimal machining feed rate, an optimal machining feedrate upper limit, and an optimal machining feedrate lower limit.

* * * * *